United States Patent [19]

Gargini

[11] 4,386,365

[45] May 31, 1983

[54] COMBINED WIRED BROADCASTING AND VIEWPHONE SYSTEM

[75] Inventor: Eric J. Gargini, West Drayton, England

[73] Assignee: Communications Patents Limited, London, England

[21] Appl. No.: 155,076

[22] Filed: Jun. 2, 1980

[30] Foreign Application Priority Data

Jun. 19, 1979 [GB] United Kingdom ............... 7921335

[51] Int. Cl.³ ............................................. H04N 7/14
[52] U.S. Cl. .................................. 358/85; 179/2 TV; 455/5
[58] Field of Search .............. 358/85, 86; 179/2 TV; 455/3, 4, 5, 6

[56] References Cited

U.S. PATENT DOCUMENTS 3,706,996 12/1972 Hafner ........................... 179/2 TV

FOREIGN PATENT DOCUMENTS 1314457 4/1973 United Kingdom .

Primary Examiner—John C. Martin
Assistant Examiner—Edward L. Coles
Attorney, Agent, or Firm—Laurence R. Brown

[57] ABSTRACT

A wired broadcasting system comprises a plurality of subscriber stations each connected to a central exchange by a respective transmission cable, a plurality of bus-bars located at the central exchange, a plurality of program sources for applying television signals at a first frequency to respective bus-bars, a plurality of switches located at the central exchange for selectively connecting each subscriber cable to any one of the bus-bars, and at least one receiver at each subscriber station for receiving signals at the first frequency, each subscriber station being provided with controls for the switches, and at least two subscriber stations being provided with a generator of television signals at a second frequency and apparatus for applying the generated signals to the cables. At least one pair of the bus-bars are interconnected by a two-way frequency changer adapted to convert signals at the second frequency on either bus-bar of the pair to signals at said first frequency and to apply the converted signals to the other bus-bar of the pair. This enables two-way visual communication to be established between the two subscriber stations via the frequency changer.

7 Claims, 6 Drawing Figures

COMBINED WIRED BROADCASTING AND VIEWPHONE SYSTEM

TECHNICAL FIELD

The present invention relates to wired broadcasting systems, and in particular to broadcasting systems in which subscribers to the system may receive programs which are made available at a central exchange and also communicate directly with other subscribers.

BACKGROUND ART

Switched wired broadcasting systems are known in which television programs are made available on respective bus bars at a central exchange, subscribers are connected to the central exchange by respective cables, and remote control switching devices are provided to enable each subscriber to connect his own cable to a selected bus bar so as to receive the program made available on that bus bar. An example of such a system is described in British Pat. No. 1,272,594. It is also known to use the cable network of such systems to carry telephone services as described in British Pat. No. 1,414,127. A further development of switched systems is described in British Pat. No. 1,306,367 which provides for television signals generated by the subscriber to be returned to the central exchange and applied to one of the normal program bus bars for distribution to any subscriber connected to that bus bar.

The above described systems are capable of supplying a wide range of services and are inherently more flexible than systems in which all signals on the system are transmitted via a single coaxial cable of limited channel capacity. One desirable service that is not however provided is that of a viewphone, i.e. a two-way service capable of visually as well as audibly interconnecting two subscribers.

With the system of British Pat. No. 1,414,127, it is possible for a subscriber to apply a program signal to one of the system bus bars and then call by telephone another subscriber to instruct him to select that bus bar so that there is one-way visual communication. The calling subscriber cannot see the called subscriber as the called subscriber cannot return a program signal to the exchange as his equipment is occupied with receiving the signals originating with the calling subscriber. If the calling and called subscribers were to generate signals at different frequencies, the two subscriber generated signals could be applied to one channel without interference, i.e. one subscriber could select a particular bus bar, transmit a signal at a first frequency, and call a second subscriber by telephone to instruct him to select the same bus bar and transmit at a second frequency. There would then be two-way audio and visual communication. Unfortunately each subscriber to such a system would require a switchable two frequency receiving television set and a switchable two frequency transmitter for originating television signals. In addition the two subscribers would need to correctly tune the various system components prior to establishing visual communication. Thus not only would the system operator be required to supply relatively complex and therefore expensive equipment, but in addition the system subscribers would have to follow relatively complex and tedious procedures to make desired viewphone calls.

It is an object of the present invention to provide a broadcasting system which is capable of providing high quality television distribution and viewphone services, and which provides these services in a way which enables both services to make full use of the basic distribution network.

It has surprisingly been found that these objects can be met by providing for each subscriber to receive signals at a first frequency and by providing for each subscriber to transmit signals at a second frequency, two-way frequency changes being provided at a central location for converting subscriber-generated transmitted signals at the first frequency to the second frequency for reception by the other subscriber or subscribers.

BRIEF DESCRIPTION OF THE INVENTION

Accordingly the present invention provides a wired broadcasting system comprising a plurality of subscriber stations each connected to a central exchange by a respective transmission cable, a plurality of bus bars located at the central exchange, a plurality of program sources for applying television signals at a first frequency to respective bus bars, a plurality of switches located at the central exchange for selectively connecting each subscriber cable to any one of the bus bars, and at least one receiver at each subscriber station for receiving signals at said first frequency, each subscriber station being provided with means for controlling said switches, and at least two subscriber stations being provided with means for generating television signals at a second frequency and for applying the generated signals to said cables, characterised in that at least one pair of said bus bars are interconnected by a two-way frequency changer adapted to convert signals at said second frequency on either bus bar of said pair to signals at said first frequency and to apply the converted signals to the other bus bar of said pair, wherby two-way visual communication can be established between said at least two subscriber stations via said frequency changer.

Preferably the frequency changer comprises two parts each connected to a respective directional coupler and two mixer circuits interconnecting the directional couplers. An oscillator provides a stable fixed frequency to each mixer to establish the appropriate frequency change. Filter circuits in series with the mixers suppress the unwanted first frequency appearing at the mixer inputs.

Preferably the switches are in the form of a crosspoint switching matrix, the switches being in the form of pin diode "T" switches or reed switches for example. These bus bars which are interconnected by the frequency changers are connected to a microprocessor so that the microprocessor can ascertain which bus bars are available for use when a subscriber indicates a desire to make a viewphone call. The microprocessor then selects an available pair of interconnected bus bars and connects the calling and called subscriber stations to respective ones of the pair of busbars. As a further facility, the microprocessor may be arranged on demand to apply a subscriber generated signal to one of a pair of interconnected bus bars, and then to permit access to the other of the pair of bus bars by other subscribers to the system. Thus a subscriber could generate a signal which could then be made available as an alternative program to subscribers in the normal way.

It is desirable to maintain favourable synchronised or offset relationships between the carrier frequencies appearing in the system, and thereby minimise cross-view between channels. Accordingly, a microprocessor may be provided to monitor the oscillator frequencies applied to individual frequency changers, and to adjust these oscillator frequencies to obtain optimum carrier relationships.

THE DRAWING

An embodiment of the present invention will now be described, by way of example, with reference to the accompanying drawings, in which.

THE PREFERRED EMBODIMENT

Figure 1:
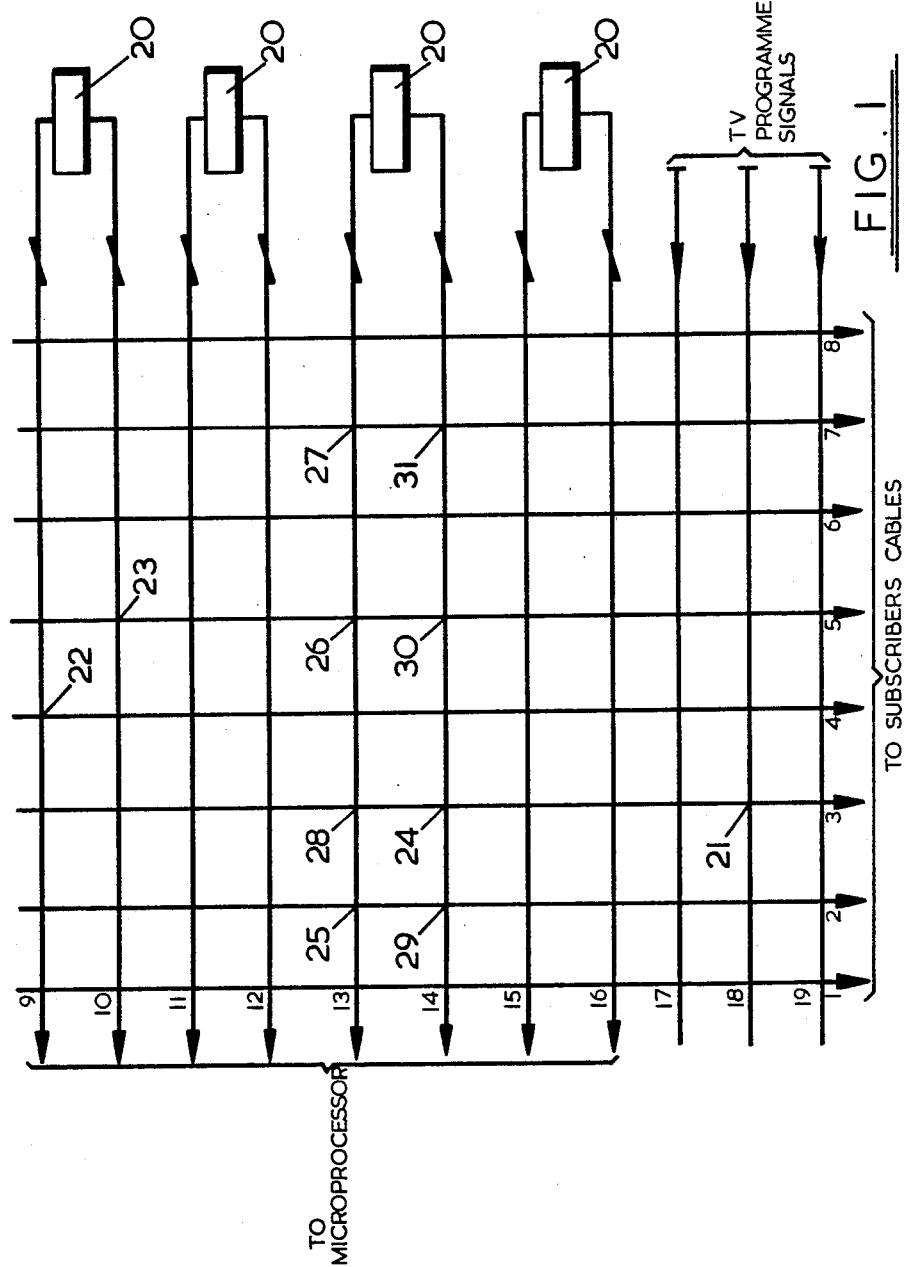
FIG. 1 is a schematic diagram of a crosspoint switching system located at a central exchange installation of an embodiment of the invention.

Referring to FIG. 1, the vertical columns of the illustrated crosspoint matrix represent conductive paths connected by cable via balancing circuits or baluns to respective subscribers to the system. Only eight conductive paths are shown for the sake of simplicity, each serving one of subscribers 1 to 8. The horizontal rows represent bus bars to which each subscriber may connect his equipment by controlling switches (not shown) located at each crosspoint. For the sake of simplicity only eleven bus bars 9 to 19 are shown, but it will be appreciated that as many bus bars may be provided as is necessary to meet the particular requirements of the system. Bus bars 9 to 16 are connected in pairs by frequency changers 20 and are also connected to a microprocessor as described below. Bus bars 17 to 19 carry conventional television programs at a single frequency of for example 8.9 MHz.

As will be described below, each subscriber is provided with receiving equipment capable of receiving high frequency television signals at 8.9 MHz (obviously other frequencies could be used and the frequencies referred to herein are merely exemplary). Those subscribers who wish to take advantage of viewphone services are also provided with television signal generating equipment as described below. This equipment enables the subscriber to originate signals at 17.8 MHz for return to the exchange crosspoint switching matrix, the receiving level of the 17.8 MHz luma carrier being approximately 20 mV r.m.s. The sending level to the bus bar system is 200 mV. Signals at 17.8 MHz applied to any one of bus bars 9 to 16 are converted to 8.9 MHz by the respective frequency changer 20 and applied to the other bus bar of the pair of bus bars interconnected by that frequency changer.

Thus, if a subscriber wishes to view one of the programs made available on bus bars 17, 18 and 19 he remotely controls the switch located at the appropriate crosspoint to close. For example, if subscriber 3 wishes to view the program on bus bar 18, he closes the switch at crosspoint 21. If however the subscriber wishes to make visual contact with another subscriber to the system, it is simply necessary to connect his equipment to any one of the bus bars 9 to 16 which is unoccupied, for example bus bar 9, and then connect the subscriber whom he wishes to contact to bus bar 10, bus bars 9 and 10 being interconnected by one of the frequency changers 20. For example, subscriber 4 could be connected to bus bar 9 by closing the switch at crosspoint 22, and then subscriber 5 could be connected to bus bar 10 by closing the switch at crosspoint 23. Television signals generated by subscriber 4 would then be transmitted at 17.8 MHz via crosspoint 22 to the frequency changer 20. These signals would then be converted to 8.9 MHz and transmitted to subscriber 5 via crosspoint 23. Program signals generated by subscriber 5 at 17.8 MHz could be transmitted in the opposite direction to subscriber 4. Thus a full viewphone service can be provided. If a subscriber wished to supply locally generated program signals for general broadcasting, these signals could be applied to any one of bus bars 9 to 16 and any interested subscriber could then select that program signal in the normal manner. For example, subscriber 3 could apply a signal to bus bar 14 via crosspoint 24, and subscribers 2, 5 and 7 could receive that signal via crosspoints 25, 26 and 27. Of course, exactly the same effect could be achieved if the signal was applied to bus bar 13 via crosspoint 28 and received from bus bar 14 via crosspoint 29, 30 and 31.

It will be appreciated from the above that a centrally switched wired broadcasting network providing simple central program selection (i.e. selection from bus bars 17, 18 and 19) can be easily expanded by providing extra bus bar capacity at the central exchange to provide full duplex visual communication between any one subscriber and any other subscriber or subscribers to the system.

Figures 2, 3:
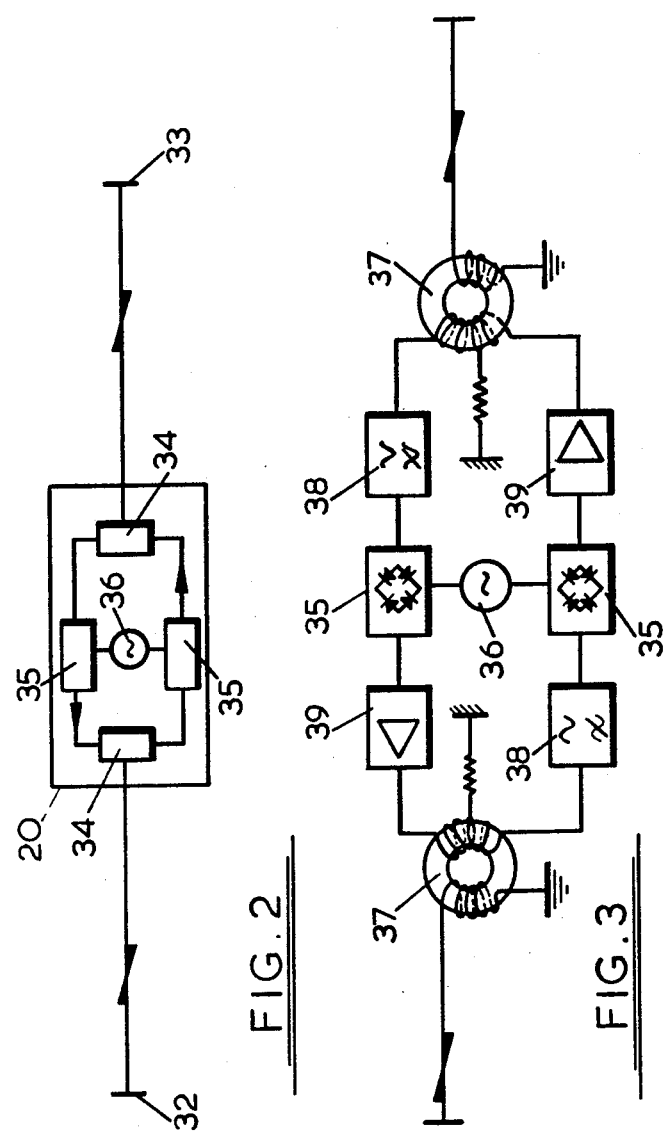
FIG. 2 is a schematic diagram of a duplex two-way frequency changer incorporated in the switching system of FIG. 1.
FIG. 3 is a more detailed schematic diagram of the frequency changer of FIG. 2.

Referring now to FIG. 2, one of the frequency changers 20 is schematically illustrated. The frequency changer comprises two ports 32, 33 each connected to a respective directional coupler and mixer circuit 34. The ports 32, 33 are connected via 75 ~ lines to program bus lines as will be apparent from FIG. 1. The circuits 34 are interconnected by diode or integrated circuit mixers 35 each receiving outputs from a common oscillator 36. Preferably the mixers 35 comprise balanced four diode modulators which are used as frequency changers for H.F. carriers of 17.8 MHz (with upper sidebands) to 8.9 MHz (with lower sidebands). The nominal output frequency of the oscillator 36 is 26.7 MHz. The oscillator 36 provides two outputs to drive two frequency chargers and is varactor controlled in a conventional manner, the varactor control not being shown. Thus a signal at 17.8 MHz applied to either port of the frequency charger appears at the other port at 8.9 MHz. The use of a common oscillator permits self-locking of the subscriber two-way equipment as described below.

Referring to FIG. 3, the frequency changer 20 is shown in more detail and comprises isolation transformers 37 corresponding to the directional couplers 34 providing 40 dB input/output isolation, high pass filters 38 and high frequency amplifiers 39. The filters 38 provide −3 dB attenuation at 15 MHz, −40 dB at 8.9 MHz. The amplifiers 39 are high gain versions of the TRW CA.2818 linear hybrid amplifier giving a 32 dB gain and a flat response from 3 to 10 MHz. The losses in conversion from 17.8 to 8.9 MHz are twice 3 dB at the directional couplers 37 and 6 dB at the mixers 35. The amplifier gain of 32 dB, less the losses of 12 dB, gives a 20 dB overall gain i.e. the difference between the 20 mV receiving and 200 mV sending levels.

Figure 4:
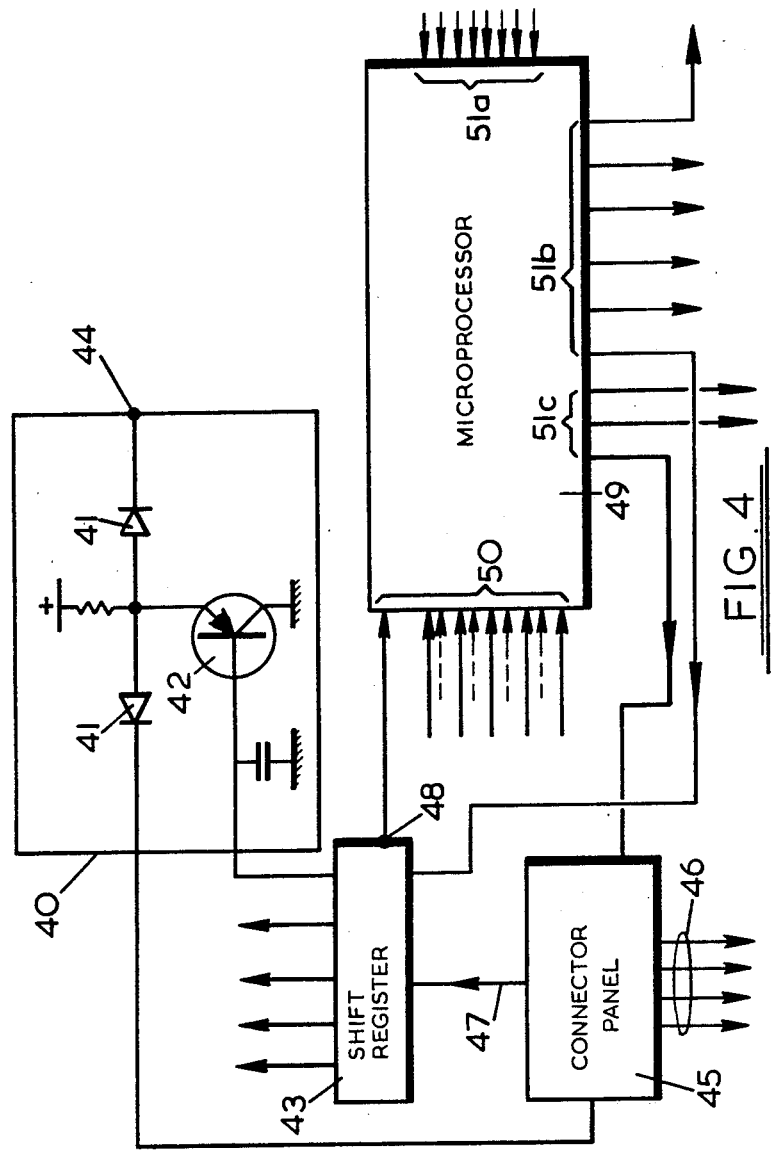
FIG. 4 is a schematic diagram of a cross-point switching device and an addressing system for that switching device.

Referring now to FIG. 4, the control circuitry for the crosspoint switches will now be described in further detail. Essentially control is effected by the subscriber applying "dial" and "reset" control pulses to a four-conductor cable linking his equipment to the exchange. The way in which these pulses are generated and processed will be familiar to persons skilled in telephone and related techniques and will not therefore be described in great detail. The general principles are however described in published German Pat. Nos. P 27 48 661.9 (equivalent to U.S. Pat. No. 4,153,847) and P 27 48 662.0 (equivalent to British Pat. No. 1,567,455).

FIG. 4 shows one bidirectional crosspoint switch 40 as comprising diodes 41 connected in series with the signal path. A transistor 42 is controllable by a shift register 43 to either conduct (switch on) or not conduct (switch off). When transistor 42 is non-conducting, both the diodes 41 are forward biased so that television signals may pass in either direction between terminal 44 which is connected to one of the bus bars (FIG. 1) and a connector panel 45 to which the subscriber is connected by four conductor cable 46. The connector panel 45 is effective to separate subscriber generated dial and reset control pulses from high frequency television signals for application on line 47 to the shift register 43. The connector panel 45 includes a balun (not shown) for transferring the dialling and reset pulses to the shift register and for converting the unbalanced 75~ line impedance of switch 40 to a 140~ balanced signal for application to the subscriber feeder cable. The shift register 43 is of course connected to each crosspoint switch which can be controlled by the single subscriber in question, and the panel 45 is also connected to receive signals made available via any one of those crosspoint switches.

When a subscriber wishes to view a normal broadcast television signal, i.e. does not require two-way communications with another subscriber, he manipulates his selector to apply the appropriate number of dialling pulses via his cable and the panel 45 to the shift register 43. The shift register then closes the appropriate crosspoint switch to connect the subscriber cable to the selected one of bus bars 17, 18 and 19. The cross point switch used for selecting a normal broadcast television signal is of the type described in the above mentioned German patent specification which also describes the generation and processing of dialling and reset pulses using a shift register.

When a subscriber wishes to contact another subscriber direct, he first dials channel "N+1," where N is the total number of bus bars available at the exchange. This causes the register to generate a "carry" output on terminal 48 which is connected to a microprocessor 49 (The terminals 50 of the microprocessor are connected to the carry outputs of all the shift registers of the system and represent "calling" subscriber input lines to the microprocessor). Thereafter the subscriber dials the number of the subscriber he wishes to contact and the resultant dialling pulses are passed to the microprocessor via the carry output 48 of the shift resister. The microprocessor 49, which receives inputs 51a indicative of which of the frequency changers 20 are occupied, then selects a pair of unused bus bars which are connected by a frequency changer and connects the calling and called subscribers to respective ones of the pair of applying appropriate signals to outputs 51b which are in turn connected to respective subscribers shift registers. The signals on outputs 51b set the called and calling subscribers shift registers to the bidirectional crosspoints associated with the allocated converter 20. Full two-way audio/visual communication is thus established.

In more detail, the microprocessor 49 may be an SBP 9900A available from Texas Instruments. This is programmed after manufacture to perform the following functions:

A. To examine the dialled pulse train from the subscriber, which in this example is a standard Strowger dial sequence, and to recognize from the dialled code whether the subscriber is merely seeking access to a normal broadcast television channel or whether he is attempting to set up a two way viewphone connection with a second subscriber.

B. In the event of a two way viewphone request, to apply via the connector panel 45 and two of the four lines of the called subscriber cable, a calling signal generated by the microprocessor 49 on line 51C. There is one line 51C for each subscriber.

C. To monitor on line 48 a Strowger dial code sent automatically from the called subscriber's premises when he acknowledges receipt of the 'ringing' tone by, for example, lifting the microphone handset of FIG. 6.

Figure 5:
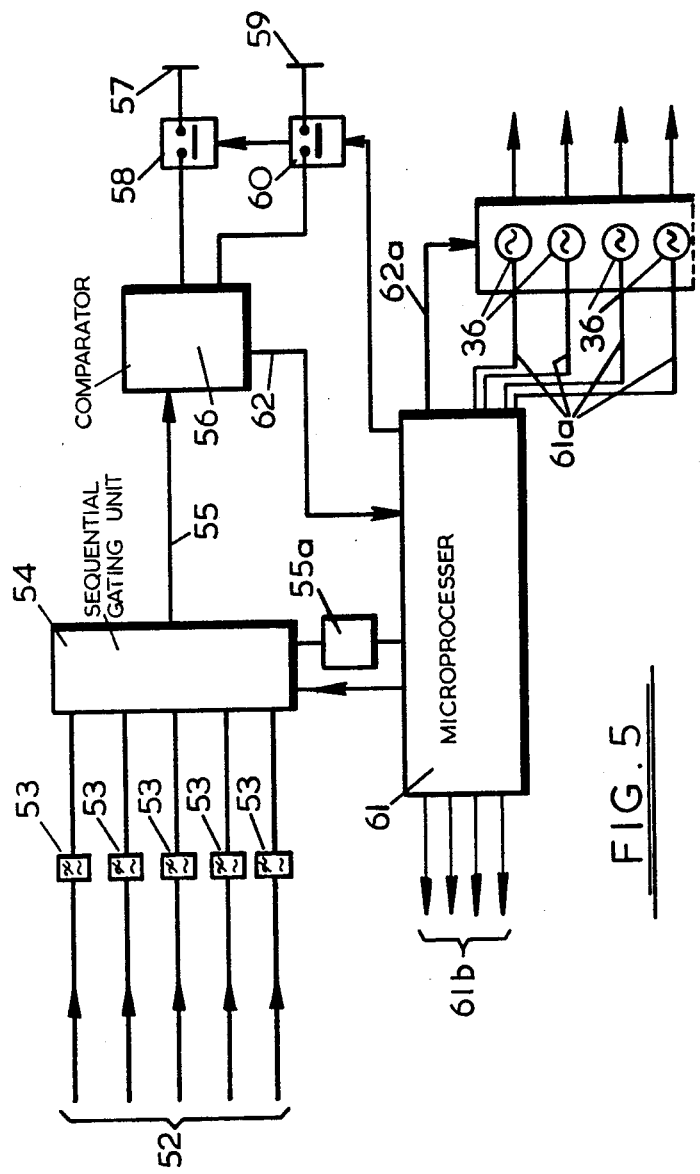
FIG. 5 illustrates circuitry for locking the frequency of carriers used in the system.

D. To examine the bank of two way converters 20, to find one not currently in use as listed by local oscillator 36 addresses from a further microprocessor 61 (FIG. 5).

E. Assuming acknowledgement of receipt and location of an unused converter 20, to energize a bi-directional crosspoint 40 associated with the unused converter 20 at the 'calling' and 'called' subscribers' exchange equipment.

F. To release the converter 20 when either called or calling subscriber terminates the two way link (by replacing the telephone handset).

When a subscriber wishes to make his locally generated signals generally available rather than simply to communicate with one other subscriber, he again dials channel "N+1" to gain access to the microprocessor, but then dials a code number indicating that he wishes to provide signals for general broadcast. The microprocessor identifies this code number, selects an unused pair of bus bars, and connects the signal-originating subscriber to one of that pair of bus bars. Information indicating the availability of the subscriber-originated program is then broadcast under the control of the microprocessor on an alpha-numeric "inventory" channel carrying program information and directly accessible to subscribers. Thus a subscriber consulting the inventory channel can see that a subscriber-originated program is available and directly select that program by connecting his equipment to the other bus bar of the pair.

Referring now to FIG. 5, a system for locking the frequency of carriers on the network is schematically illustrated. Inputs 52 are connected by low-pass filters 53 to a sequential gating unit 54. The inputs 52 are connected via emitter follower circuits (not shown) to the bus bar 9 to 19 (FIG. 1) and thus carry all the 8.9 MHz and 17.8 MHz signals appearing in the system. The emitter followers provide a high input impedance and isolate the filters 53. The low-pass filters 53 remove the 17.8 MHz signals and therefore the output 55 of the gating unit 54 comprises a series of nominal 8.9 MHz signals sampled from the inputs 52. The low pass filters provide a 3 dB loss at 10 MHz and at least a 30 dB loss at 17.8 MHz.

The sequential gating unit 54 comprises a series of cross-point switches of the type used to connect subscribers to normal television program bus bars 17, 18 and 19 (FIG. 1).

The output 55 is compared in comparator 56 with a reference signal switched from either source 57 via switch 58 or source 59 via switch 60. The two sources provide 8.9 MHz signals which are offset relative to each other by half line frequency, i.e. 8.863281 MHz and 8.855469 MHz. The switches 58 and 60 are controlled by a microprocessor 61 which also controls gating unit 54 and receives the output 62 of the comparator 56. The pulses from the microprocessor 61 step the switches in the gating unit 54 to cycle through all the bus bar 8.9 MHz inputs continuously.

The comparator 56 operates as a digital phase detector with infinite capture range. A suitable comparator is described in I.E.E. Proc. Vol 127 P+H No. 2, April, 1980. Bursts of 8.9 MHz from each bus bar line in turn are applied via gating unit 54 to one input and compared with reference bursts of 8.9 MHz from a master crystal controlled oscillator. The bursts of 8.9 MHz carrier from the gating unit are applied via line 55 to the comparator and via a detector 55a to the microprocessor 61.

The system operates to compare each 8.9 MHz signal appearing at output 55 with either of the signals appearing at sources 57 and 59. The microprocessors 61 then allocates carrier signals to the bus bars and subscriber lines which are either synchronised or half line offset to obtain optimum performance. The criteria for obtaining optimum performance are described in British Pat. No. 1,552,033. Having made the appropriate allocation, the microprocessor 61 controls the local oscillators 36 of the frequency changers 20 (FIG. 1) via varactor control line 61a so that the nominal 26.7 MHz outputs of these local oscillators cause the 8.9 MHz signals transmitted over the system to have the allocated interrelationships.

The microprocessor 61 may be a SBP 9900A which is a 16 bit microprocessor with a speed of 3 MHz. It is programmed to perform the following functions:

A. Set switch 58 to apply the output of 57 to the comparator 56.

B. Set gating unit 54 to the first program line and allow a burst of 8.9 MHz carrier into comparator 56.

C. Note that detector 55a confirms the first program line is energized and allow the burst to continue for 10 μS.

D. Switch the output of comparator 56 to the varactor control line of oscillator 36 via lines 62 and the corresponding output line 62a.

Functions A, B, C and D occur simultaneously but if no 8.9 MHz carrier is present on the first program bus bar line the microprocessor 61 immediately steps gating unit 54 to the next bus bar line. All bus bar lines are interrogated in turn but, to ensure that adjacent bus bar lines carry 8.9 MHz carriers which are interleaved by the offset frequencies provided by sources 57 and 59, switch 58 being closed for odd lines and switch 60 being closed for even lines. The microprocessor continuously provides the sample and comparison function and the control voltages applied to oscillators 36 bring each oscillator to the desired 26.7 MHz beat frequency. It is important to note that at least some program lines will be carrying normal television program signals which are already locked to the sources 57 and 59, either by virtue of the off-air phase locked frequency changing mode of operation or because for local origination modulators are driven directly by master generators supplying sources 57 and 59. These program sources may be correctly allocated with respect to carrier drive signals from sources 57 or 59 by arranging that the microprocessor operates further switches (not shown) of the 58 or 60 type depending on whether the output of comparator 56 is zero or not during the sampling process. It should be noted that, to ensure locking of 8.9 MHz carriers, which appear on bus bar lines after translation from subscriber generated carriers of 17.8 MHz, the control of the respective local oscillator 36 operating at 26.7 MHz automatically produces the desired and correctly locked 8.9 MHz carrier. The fact that the originating subscriber produces the 17.8 MHz carriers locally from the second harmonic of his received 8.9 MHz carrier ensures that 17.8 and 8.9 MHz carriers are automatically locked together and synchronized to master 8.9 MHz reference carriers.

The outputs 61b of the microprocessor 61 identify the addresses of unused oscillators 36 and are applied to the inputs 51a of microprocessor 49 (FIG. 4).

Figure 6:
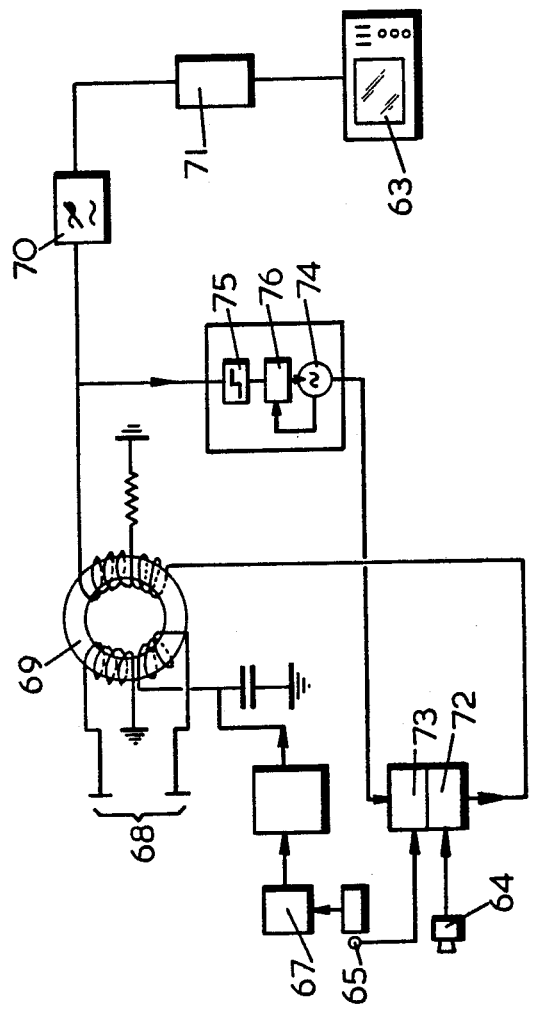
FIG. 6 is a schematic diagram of the equipment provided for one subscriber to the system.

Referring now to FIG. 6, a subscriber equipment is schematically illustrated. The subscriber is provided with a conventional UHF television receiver 63, a camera 64, a microphone 65 normally supported in a microphone handset cradle 66, and program selection devices 67 (for example buttons on a keyboard) for applying control pulses to the 140Ω cable 68 extending between the subscriber and the exchange.

Incoming television signals at 8.9 MHz are passed to the receiver 63 via a directional coupler 69 providing a 40 dB port isolation, a low pass filter 70, and a conventional inverter 71 which converts the 8.9 MHz signals to a frequency suitable for reception by the conventional receiver. The filter 70 has a −3 dB attenuation at 10 MHz, −30 dB at 17.8 MHz. Outgoing signals are generated by modulating the outputs of the camera 64 and microphone 65 on a 17.8 MHz carrier in vision and sound modulators 72 and 73. The vision modulator may be an MO 105, the sound modulator an MO 103. The 17.8 MHz output of the modulators is applied to the cable 68 via the directional coupler 69. The 17.8 MHz carrier provided by an oscillator 74 is the second harmonic of the 8.9 MHz incoming signal which is applied to the oscillator via a limiter 75 which removes the vision modulation and a comparator 76. A feedback loop is provided between the comparator and the oscillator output which controls a varactor (not shown) to ensure that the desired phase relationships between the carriers appearing in the system are maintained.

It will be appreciated that references herein to wired broadcasting systems also cover systems in which all or part of the transmission network comprises optical rather than electrically conductive transmission paths.

The system described is not limited to a programme selection system of the 'strowger' class and may be readily adapted for use with b.c.d. or 'touch tone' dialling systems. Thus, and with reference to FIG. 4, the shift register 43 may, for b.c.d. or 'touch tone' dialling systems, comprise the appropriate decoder and store, outputs from which are routed, as in FIG. 4, to each crosspoint 40.

What is claimed is:

1. A wired broadcasting system comprising a plurality of subscriber stations each connected to a central exchange by a respective transmission cable, a plurality of bus-bars located at the central exchange, a plurality of program sources for applying television signals at a first frequency to respective bus-bars, a plurality of switches located at the central exchange for selectively connecting each subscriber cable to any one of the bus-bars, and at least one receiver at each subscriber station for receiving signals at said first frequency, each subscriber station being provided with means for controlling said switches, and at least two subscriber stations being provided with means for generating television signals at a second frequency and for applying the generated signals to said cables, characterised in that at least one pair of said bus-bars are interconnected by a two-way frequency changer adapted to convert signals at said second frequency on either bus bar of said pair to signals at said first frequency and to apply the converted signals to the other bus-bar of said pair whereby two-way visual communication can be established between said at least two subscriber stations via said frequency changer.

2. A wired broadcasting system according to claim 1, wherein the frequency changer comprises two parts each connected to a respective directional coupler and two mixer circuits interconnecting the directional couplers.

3. A wired broadcasting system according to claim 2, comprising an oscillator providing a stable fixed frequency to each mixer to establish the appropriate frequency change, and filter circuits in series with the mixers to suppress the unwanted first frequency appearing at the mixer inputs.

4. A wired broadcasting system according to claim 1, wherein the switches are in the form of a crosspoint switching matrix, the switches being in the form of pin diode "T" switches.

5. A wired broadcasting system according to claim 1, wherein those bus-bars which are interconnected by the frequency changers are connected to a microprocessor so that the microprocessor can ascertain which bus-bars are available for use when a subscriber indicates a desire to make a viewphone call, whereby the microprocessor can select an available pair of interconnected bus-bars to connect the calling and called subscriber stations to respective ones of the pair of bus-bars.

6. A wired broadcasting system according to claim 5, wherein the microprocessor is arranged on demand to apply a subscriber generated signal to one of a pair of interconnected bus-bars, and then to permit access to the other of the pair of bus-bars by other subscribers to the system, whereby a subscriber can generate a signal which is made available as an alternative program to subscribers.

7. A wired broadcasting system comprising a plurality of subscriber stations each connected to a central exchange by a respective transmission cable, a plurality of bus-bars located at the central exchange, a plurality of program sources for applying television signals at a first frequency to respective bus-bars, a plurality of switches located at the central exchange for selectively connecting each subscriber cable to any one of the bus-bars, and at least one receiver at each subscriber station for receiving signals at said first frequency, each subscriber station being provided with means for controlling said switches, and at least two subscriber stations being provided with means for generating television signals at a second frequency and for applying the generated signals to said cables, characterised in that at least one pair of said bus-bars are interconnected by a two-way frequency changer adapted to convert signals at said second frequency on either bus bar of said pair to signals at said first frequency and to apply the converted signals to the other bus-bar of said pair whereby two-way visual communication can be established between said at least two subscriber stations via said frequency changer, and further comprising a microprocessor arranged to monitor the oscillator frequencies applied to individual frequency changers and to adjust these oscillator frequencies to obtain optimum carrier relationships.

* * * * *